Feb. 19, 1963  D. C. WRIGHT  3,077,807
ROLLER DIE APPARATUS
Filed July 23, 1962  4 Sheets-Sheet 1

INVENTOR.
DAVID C. WRIGHT
BY
Oldham & Oldham
ATTYS.

Feb. 19, 1963
D. C. WRIGHT
3,077,807
ROLLER DIE APPARATUS
Filed July 23, 1962
4 Sheets-Sheet 4
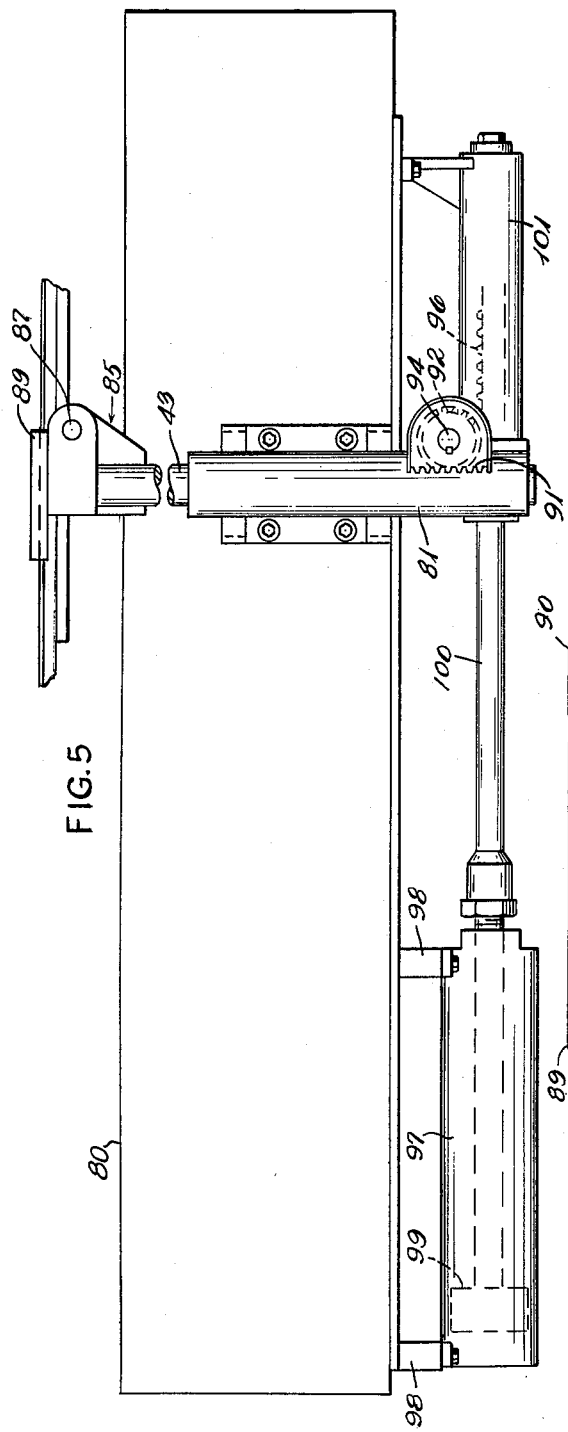
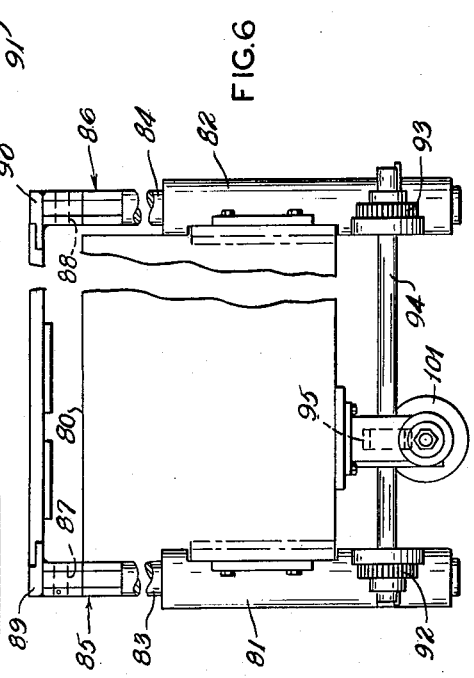
INVENTOR.
DAVID C. WRIGHT
BY
ATTYS.

3,077,807
ROLLER DIE APPARATUS
David C. Wright, Cuyahoga Falls, Ohio, assignor to The Falls Engineering and Machine Company, Cuyahoga Falls, Ohio, a corporation of Ohio
Filed July 23, 1962, Ser. No. 214,781
7 Claims. (Cl. 83—532)

This invention relates to roller die apparatus wherein sheet material is laid over a flat supporting platen, cutting dies are superimposed upon the material and clamped against it, and pressure is applied progressively to the dies by a roller traveling thereover.

The present invention constitutes an improvement upon the roller die apparatus disclosed and claimed in U.S. Patent No. 2,772,736. In the apparatus of this patent the cutting die is placed on the flat bed platen with cutting edges upward, material is placed on the die, and the pressure roller is passed over the material to press it against the die to cut the material to the die pattern. However, when cutting foam or other soft materials with the patented apparatus the material is pushed out ahead of the roller, particularly when the material is thick, and the cutting of the material is distorted. For example, non-vertical cuts result. Efforts have been made to drive the roller at a different surface speed than the forward movement of the roll axis would provide, so as to pull the material into the roll bight and compensate for the pushing of the material ahead of the roller. However, this is very difficult to control and is not readily adjustable.

It is the general object of the present invention to avoid and overcome the foregoing and other difficulties of and objections to prior art practices by the provision of an improved roller die apparatus in which the material to be cut is placed against the bed or platen of the apparatus, the cutting die, with cutting edge down, is clamped against the material, and the roller is progressively passed over the upper surface of the die to effect the progressive cutting action on the material.

Another object of the invention is the provision of apparatus of the type described wherein the cutting die is made relatively flexible to facilitate the cutting operation defined while still adequately clamping the material so that the die cutting action results in very accurate and undistorted cuts.

Another object is to provide for supporting and raising and lowering a cutting die relative to an underlying platen which supports material to be cut.

Another object of the invention is to provide a roller die apparatus in which the means and force holding the die against the work on the bed act in the same direction as the cutting force on the die of the roller.

A further object is to provide a sufficient flexibility in the cutting die whereby the cutting die acts like a cutting roller of infinite radius.

Another object is to provide for lifting and tipping of the die after cutting to provide access for easier removal of the cut or trimmed articles from the die.

A still further object is to provide such an apparatus with a high die lift in a minimum working space of the machine.

These and other objects will appear from the following description and the accompanying drawings.

Of the drawings:

FIG. 5 is a side elevational view of another embodiment of the invention illustrating different die moving means and wherein the die is mounted for tilting movement; and FIG. 6 is an end elevation of the apparatus of FIG. 5.

Figure 1:
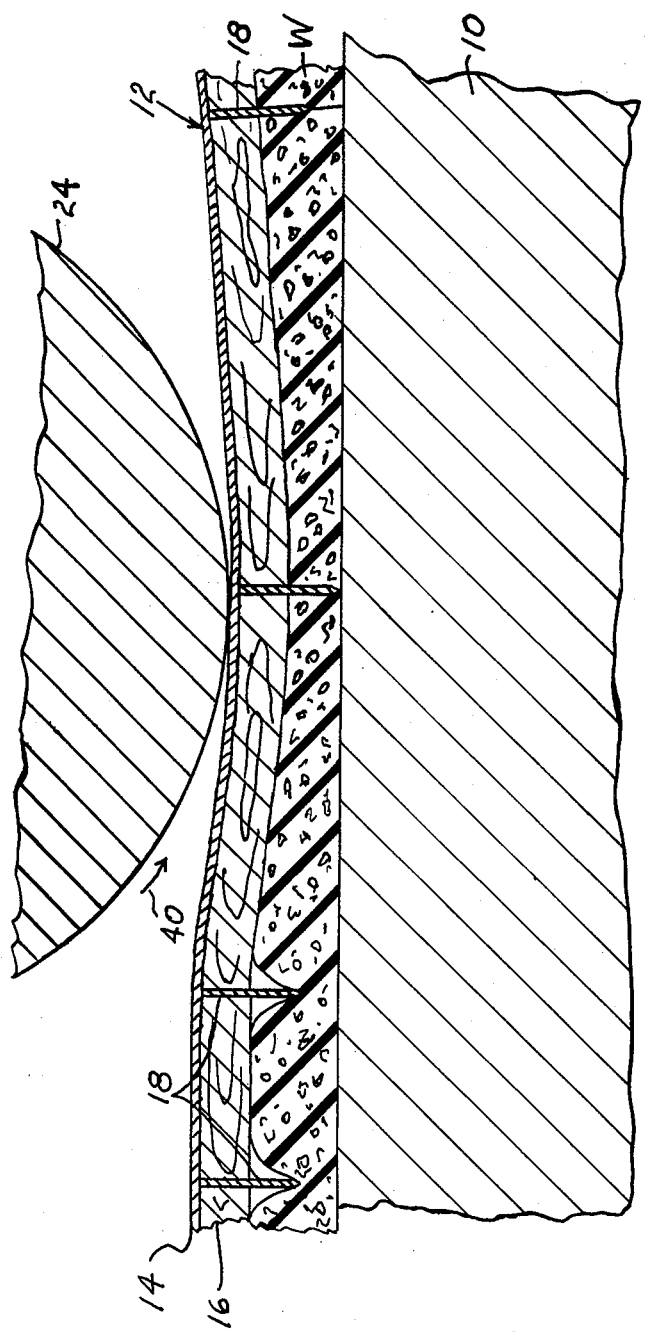
FIG. 1 is a diagrammatic, fragmentary, longitudinal, vertical cross sectional view of one embodiment of apparatus incorporating the principles of the invention and illustrating the detail operation of the roller, die, work, and bed.

The apparatus of the invention is an improvement upon the apparatus shown and described in U.S. Patent No. 2,772,736. Hence, the basic apparatus is not illustrated in detail. But having reference to FIG. 2, the apparatus of the present invention includes a bed or platen 10, usually of metal and horizontal, and of a size to receive a work piece W thereon which is adapted to be cut into a plurality of parts or pieces. The work W is typically a sheet of foamed plastic up to several inches thick, but the work can be any of a variety of sheet materials of one or more layers and capable of being cut by a die working against the bed 10.

Positioned above the work W on the bed 10 and normally held parallel to the bed is a relatively thin and flexible die shown as a whole by the numeral 12, and of the type, for example, shown in my copending patent application Serial No. 836,197, filed August 26, 1959. This type of die usually includes a flat, thin sheet metal upper surface 14, a plywood body 16 into which saw slots have been made, the saw slots receiving downwardly extending knives 18 held by the saw slots in the shapes to be cut from the work W.

Figure 2:
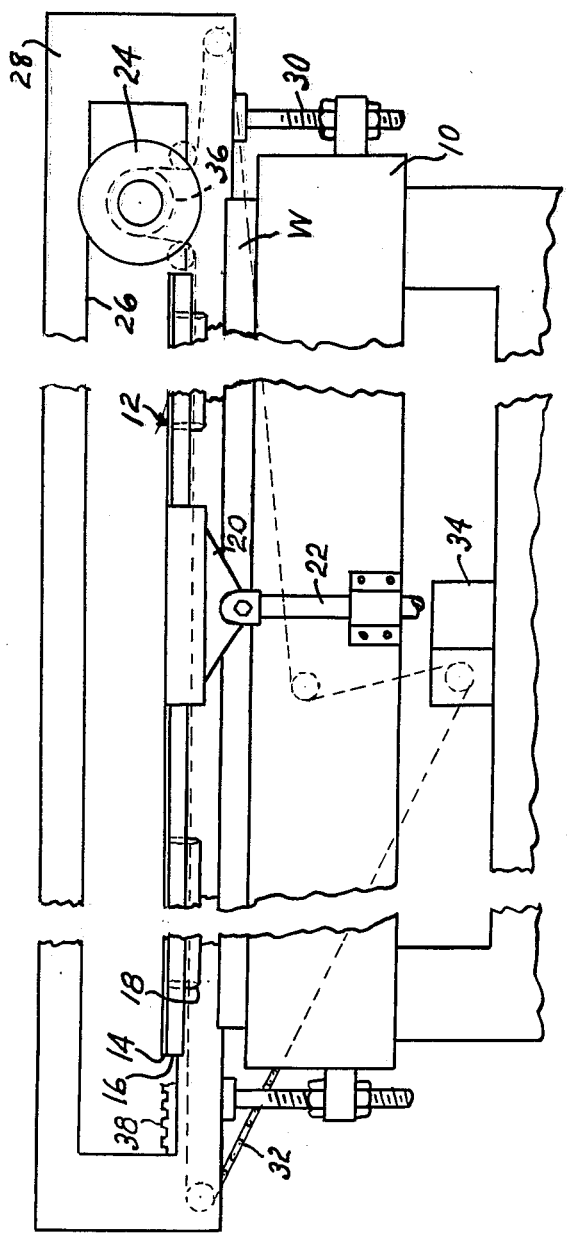
FIG. 2 is a diagrammatic, fragmentary side elevation of a more complete view of the roller die apparatus of the invention with certain portions thereof broken away.
Figure 4:
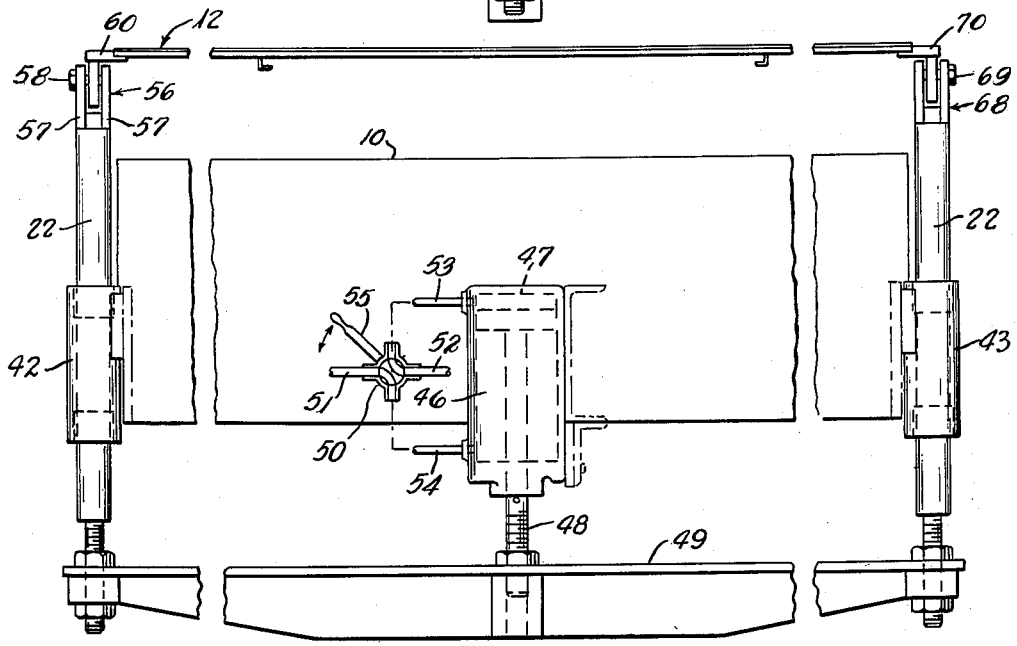
FIG. 4 is a front elevation of the apparatus of FIG. 3.

The die 12 is supported upon opposed lateral edges by brackets 20 connected to rods 22 operated by a fluid pressure motor not shown in FIG. 2 but illustrated in FIG. 4, whereby the die 12 can be moved to clamp the work W against the bed 10, or the die can be raised out of the way to allow work W to be moved on and off the bed 10.

Once the die 12 is moved down to clamp the work W on the bed 10 the roller 24 of the apparatus is moved over the top of the die 12 with a heavy line pressure thereon to force the knives 18 through the work W and against the bed 10. The roller 24 is journalled at its ends in windows 26 in side frames 28 (one of these being removed to allow the rest of the apparatus to be better seen), and the side frames 28 are adapted to be adjusted up and down by screws 30 whereby the clearance between the roller and the bed 10 can be adjusted to provide the best cutting action on the work W.

The roller 24 is driven across the top of the die 12 by a chain 32 which is driven by a motor-reducer 34. Rotation of the roller 24 moves it laterally in the window 26 by engagement between a sprocket 36 on the roller and a rack 38 on the edge of the window.

The action between the roller 24, the die 12, the work W, and the bed 10 is best seen in FIG. 1. The left hand side of this figure shows how the die is used to clamp the work W down against the bed 10 and hold the work exactly in position in relation to the die. The knives 18 have pressed into the work W (shown to be a sheet of foamed plastic) but have not yet cut it or have only cut it a little.

Now as the roller 24 is rotated in the direction of the arrow 40, the roller passes with heavy line-like pressure over the back of the die and progressively presses the knives 18 through the work W and down against the bed 10, as seen at the center of FIG. 1. To the right of FIG. 1 the die has sprung back away from the bed 10 under the spring action of the foam material cut.

The die 12 thus flexes or bends out of its own plane during the cutting operation to act like a cut performed by a roller of very large radius. Additionally, the means clamping the die against the work act in the same direction as the force of the roller so that the die moves into the work and at least partially stays there during and after cutting.

Secured to opposite sides of the platen 10 are a pair of vertical guide bushings 42, 43 in which a pair of vertical rods 22 are slidably mounted.

Figure 3:
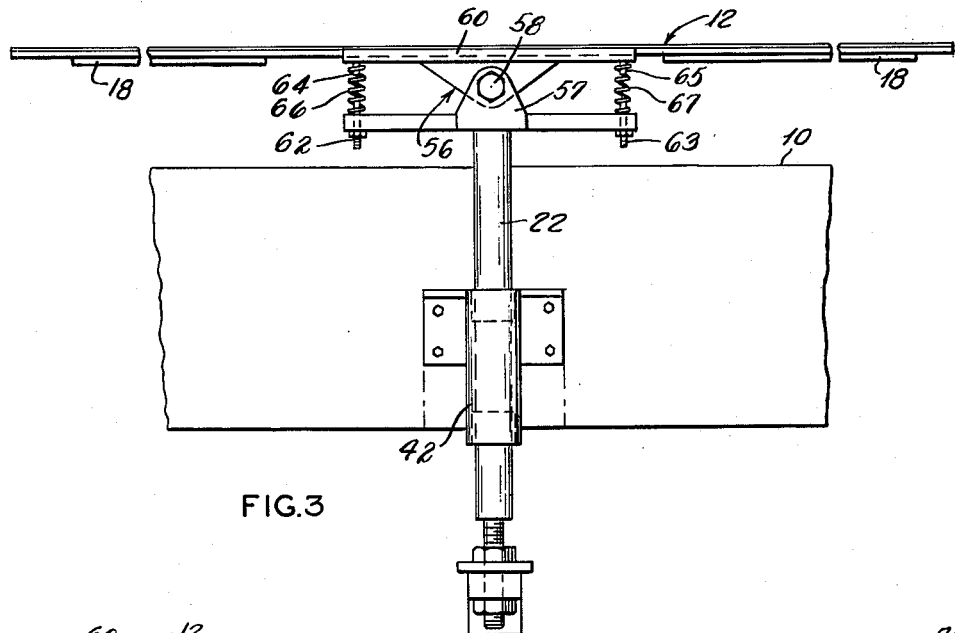
FIG. 3 is a side view of die supporting and moving mechanism constructed in accordance with and embodying the invention as applied to the supporting bed or platen of the roller die cutting apparatus, with parts of the bed and die broken away.

FIGS. 3 and 4 of the drawings show in greater detail the die raising and lowering means.

For raising and lowering the vertical rods in unison, a double acting fluid pressure operated cylinder 46 is mounted on the platen 10 with its axis vertical. The cylinder 46 has a piston 47 therein secured to a piston rod 48. The piston rod 48 is in turn secured to the center of a yoke 49 to the ends of which the rods 22 are secured. A reversing valve 50 is adapted to alternately connect opposite ends of the cylinder with a fluid pressure supply line 51 and an exhaust line 52 by way of pipes 53, 54. The valve may be operated by a hand lever 55 or by other means.

For providing for tipping movement of the cutting dies, rod 22 is provided at is upper end with horizontally elongate supporting head 56 having central upstanding ears 51, 57 cross bored to receive a pivot bolt 58. An elongate cutting die supporting bracket 60 is pivotally mounted on the bolt 58 and supports a relatively thin and flexible cutting die 12 such as the cutting die and support previously described.

The bracket 60 extends in the same direction and over the supporting head, each end of the supporting head has a tension screw 62, 63 vertically projecting thereabove and in alignment therewith, each end of bracket 60 has a downwardly projecting pin 64, 65. A coil spring 66 is mounted between the support 56 and the bracket about screw 62 and pin 64. A similar spring 67 is mounted about screw 63 and pin 65 so that bracket 60 is free to rock on its pivot only by compression of one of the springs.

The other rod 22 is similarly provided at its upper end with similar supporting head 68 having a pivot 69 on which a similar bracket 70 is pivotally mounted for engaging the opposite margin of the cutting die 12 or its support.

It will be seen that the cutting die 12 is more or less free to tip angularly out of a horizontal plane and may find its bearing upon the work under the joint action of the roller pressure and the pull down of the pressure cylinder 46. The die is more or less free to flex and acts like a roller cutter of infinite radius when it contacts the sheet material under the joint action described. The die may be quickly raised to permit advance of the sheet material over the supporting platen and is especially useful where sheet feeding apparatus is present to feed stock to the press. Raising the die 12 vertically out of the work W after cutting causes the cut pieces to drop out by gravity force. If this is not sufficiently positive knock out means (not shown) may be utilized.

Now referring to the modification of FIGS. 5 and 6, a supporting press platen 80 has vertical guides 81, 82 secured to opposite sides thereof for vertically guiding a pair of die lifting rods 83, 84. The rods 83, 84 have supporting heads 85, 86 secured respectively to their upper ends and these have aligned pivot pins 87, 88 for hingedly supporting die-engaging brackets 89 and 90. The brackets 89, 90 may be secured to opposite margins of a cutting die or its supporting frame.

When the die is to be tipped at a considerable angle in order to provide access to the face of the cutting die as where the die is employed to trim molded articles from a sheet of material and the trimmed articles are to be hand stripped from the die, the brackets 89, 90 may be secured near one margin of the cutting die and the opposite margin of the cutting die may be linked to the platen 80 so as to limit its rise.

With such an arrangement, a high lift is usually required and the roller cutting apparatus would not provide space for such long operating rods and cylinders as would be required. To provide a high lift in the available space, the lifting rods 83, 84 are provided with rack teeth 91 to engage a pair of pinions 92, 93 secured to a horizontal shaft 94. A third pinion 95 is also secured to shaft 94 and meshes with a rack 96.

A long cylinder 97 is mounted horizontally under platen 80 as by brackets 98 secured to the platen. The cylinder is double-acting and has a piston 99 and a piston rod 100. Piston rod 100 is in alignment with and connects to rack 96 which is slidably mounted in a guideway 101 secured to the platen. The arrangement is such that horizontal movement of piston rod 100 is transmitted by the gearing and causes vertical movement of rods 83, 84 while all the mechanism is contained in a small space under platen 80.

With either of the illustrated embodiments, the cutting die may be lifted above the sheet material between cutting operations. The cylinder 97 is provided with a source of operating fluid controlled by a reversing valve as in the modification of FIGS. 3 and 4.

This application is a continuation-in-part of my copending application Serial No. 836,196, filed August 26, 1959, now abandoned, and entitled "Die Lifting Apparatus for Cutting Machines."

While certain embodiments and details have been shown and described for the purpose of illustrating the invention, it will be apparent to those skilled in the art that various modifications may be made therein without departing from the scope of the invention as it is defined by the appended claims.

What is claimed is:

1. The combination of a roller cutting machine having a flat stationary work supporting platen, a relatively thin and flexible cutting die thereabove for cutting sheet material supported by the platen, said die having a flat upper surface, die supporting mechanism holding said cutting die against lateral displacement, and roller pressing means engaging said surface for progressively pressing said cutting die at an infinite radius against material positioned on the platen, said die supporting mechanism comprising vertical guides on opposite lateral margins of said work supporting platen, rods slidably mounted in said guides for vertical movement, pivotal mountings at the upper ends of said rods for supporting said cutting die for pivotal movement about a horizontal axis parallel to the axis of said roller pressing means, and means located below the platen for raising and lowering the rods in unison.

2. The combination of a roller cutting machine having a flat stationary work supporting platen, a cutting die thereabove which is free to flex for cutting sheet material supported by the platen, said die having a flat upper surface, die supporting mechanism holding said cutting die against lateral displacement and roller pressing means engaging said flat surface for progressively pressing said cutting die against the platen, said die supporting mechanism comprising vertical guides on opposite lateral margins of said work supporting platen, rods slightly mounted in said guides for vertical movement, a supporting head secured to the upper end of each rod but to the side of the platen so that the heads can be moved below the surface of the sheet material on the platen without striking it, bracket means pivotally mounted at the center of each head and supporting the cutting die at opposite sides thereof for tilting movement about a horizontal axis, and spring means extending between the ends of each supporting head and the respective bracket means to yieldingly hold the cutting die horizontal.

3. The combination of a roller cutting machine having a flat stationary work supporting platen, a relatively thin and flexible cutting die thereabove for cutting sheet material supported by the platen, said die having an effectively flat upper surface, die supporting mechanism holding said cutting die against lateral displacement, and roller pressing means engaging said surface for progressively pressing said cutting die at an infinite radius against material positioned on the platen, said die supporting mechanism comprising vertical guides on opposite lateral margins of said work supporting platen, rods slidably mounted in said guides for vertical movement, means securing the rods to the cutting die, and means for raising and lowering the rods in unison to position the cutting die against the material on the platen prior to the passage of the roller pressing means.

4. The combination in a roller die apparatus of a horizonal bed adapted to receive work to be cut thereon, a relatively thin and flexible cutting die having an effectively flat upper surface and knife-like cutting edges extending downwardly of the die, means engaging the edges of the die for moving it vertically away from the bed to expose the work thereon, and for moving the die toward the bed to engage the cutting edges against the work and to clamp the work against the bed, a roller, means mounting the roller for horizontal rolling movement over the upper surface of the die to progressively force the cutting edges of the die through the work, the die progressively bending out of its place under the force of the roller, and means for adjusting the distance between the bed and the horizontal rolling movement of the roller to effect the desired cutting action of the cutting edges against the bed.

5. The combination in a roller die apparatus of a bed adapted to receive work to be cut thereon, a cutting die having an effectively flat upper surface and knife-like cutting edges extending downwardly of the die, means engaging the edges of the die for moving it away from the bed to expose the work thereon, and for moving the die toward the bed to engage the cutting edges against the work and to clamp the work against the bed, a roller, means mounting the roller for rolling movement over the upper surface of the die to progressively force the cutting edges of the die through the work, and means for adjusting the distance between the bed and the plane of the rolling movement of the roller to effect the desired cutting action of the cutting edges against the bed.

6. The combination defined in claim 5 wherein the means for moving the die to clamp the work against the bed continue to function during the movement of the roller over the die so that the force of the means and the force of the roller act together to effect the cutting of the work, with the die repositioning itself closer to the bed after the passage of the roller thereover.

7. The combination defined in claim 5 wherein the means for moving the die towards and from the bed are pivotally connected to the die so that after the cutting of the work and the movement of the die away from the bed the die can be pivoted out of a plane parallel to the bed to facilitate the removal of any cut pieces of work adhering to the die.

References Cited in the file of this patent

UNITED STATES PATENTS

| | | |
|---|---|---|
| 173,062 | Robertson | Feb. 1, 1876 |
| 345,358 | Boehme | July 13, 1886 |
| 722,452 | Mossner | Mar. 10, 1903 |
| 1,051,381 | Perry | Jan. 28, 1913 |
| 1,469,689 | Prius | Oct. 2, 1923 |
| 2,092,092 | Sinclair | Sept. 7, 1937 |
| 3,024,688 | Romm | Mar. 13, 1962 |

FOREIGN PATENTS

| | | |
|---|---|---|
| 10,935 | Great Britain | June 9, 1892 |
| 15,204 | Great Britain | June 29, 1909 |
| 269,936 | Germany | Feb. 3, 1914 |
| 602,251 | France | Dec. 21, 1925 |
| 611,193 | Great Britain | Oct. 26, 1942 |